(12) United States Patent
Fong et al.

(10) Patent No.: US 7,061,707 B2
(45) Date of Patent: Jun. 13, 2006

(54) CONFIGURABLE MULTI-MODE ARCHITECTURE FOR POWER LOSS RETRACTION OF THE READ/WRITE HEAD OF A HARD DISK DRIVE

(75) Inventors: Hin Sing Fong, Singapore (SG); Ravi Shanker, Singapore (SG)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 0 days.

(21) Appl. No.: 10/955,970

(22) Filed: Sep. 30, 2004

(65) Prior Publication Data

US 2005/0111132 A1 May 26, 2005

Related U.S. Application Data (60) Provisional application No. 60/525,476, filed on Nov. 26, 2003.

(51) Int. Cl.
*G11B 21/02* (2006.01)
(52) U.S. Cl. ........................................................ 360/75
(58) Field of Classification Search .................... None
See application file for complete search history.

(56) References Cited

U.S. PATENT DOCUMENTS

| | | | |
|---|---|---|---|
| 5,325,030 A | | 6/1994 | Yamamura et al. |
| 5,508,874 A | * | 4/1996 | Williams et al. ............... 361/92 |
| 5,737,144 A | * | 4/1998 | Ataee et al. ................... 360/75 |
| 5,809,520 A | * | 9/1998 | Edwards et al. ............ 711/115 |
| 6,177,772 B1 | * | 1/2001 | Barua et al. ................. 318/362 |
| 6,362,929 B1 | | 3/2002 | Arai et al. |
| 6,396,652 B1 | | 5/2002 | Kawachi et al. |
| 2001/0024339 A1 | | 9/2001 | Yaegashi |

* cited by examiner

*Primary Examiner*—K. Wong
(74) *Attorney, Agent, or Firm*—Lisa K. Jorgenson; William A. Munck (57) ABSTRACT

A power loss retraction architecture is provided to retract the VCM arm of a hard disk drive upon power loss. The power loss retraction architecture is configurable to be able to use energy from different sources. The selected energy source is used efficiently by applying the energy only to the VCM retract arrangement, while isolating the energy source from other circuits that are not needed to accomplish the retraction operation.

20 Claims, 8 Drawing Sheets

CONFIGURABLE MULTI-MODE ARCHITECTURE FOR POWER LOSS RETRACTION OF THE READ/WRITE HEAD OF A HARD DISK DRIVE

This application claims the priority under 35 U.S.C. §119(e) of co-pending U.S. Provisional Application No. 60/525,476, filed on Nov. 26, 2003 and incorporated herein by reference.

FIELD OF THE INVENTION

This invention relates generally to hard disk drives, and more particularly, to control of the read/write head in a hard disk drive.

BACKGROUND OF THE INVENTION

A hard disk drive includes a disk on which data is stored, a spindle motor which rotates the disk, a read/write head, and a voice coil motor (VCM) to move the head over the disk for reading/writing from/to the disk surface. When the disk is not rotating, the VCM moves the head away from the disk area. When the disk is rotating, and read/write operations are in progress, the head, which is carried on a VCM arm, is positioned above the data storage surface of the disk. When the disk is not rotating, the head is moved away from the disk in order to prevent any damage to the disk. When power loss (any power supply inactivation such as a power failure event or a power-down event) occurs, the disk will slow down and eventually stop due to its inertia. Whether the power loss is due to a power failure or a power-down event, there are several known ways to obtain energy for moving the head to a safety zone away from the disk. This movement of the head to a safety zone is also often referred to as "parking the VCM arm".

Figure 1:
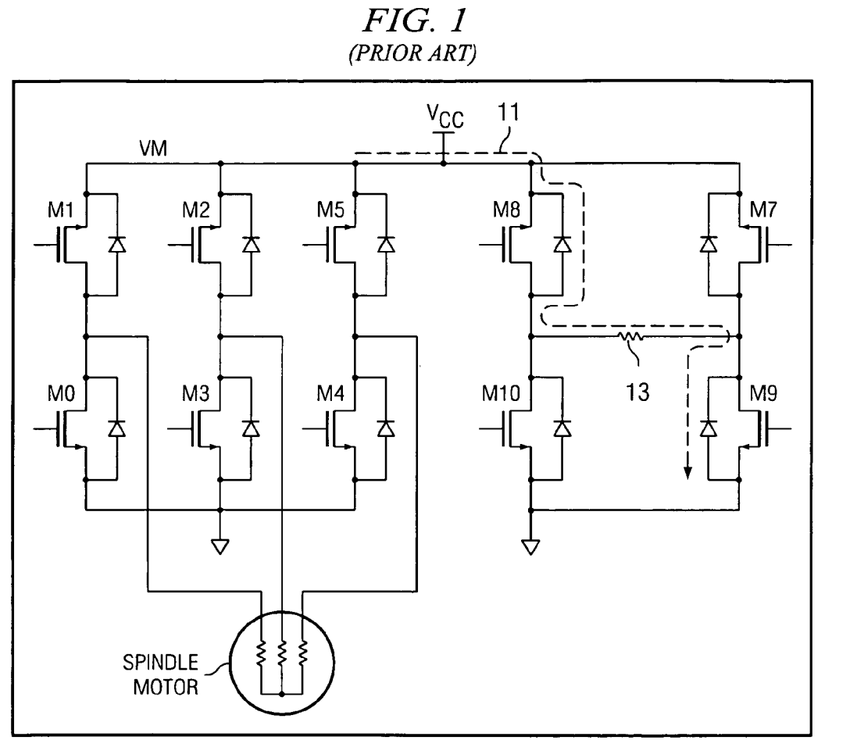
FIG. 1 illustrates the use of spindle motor energy to retract the read/write head according to the prior art.

One conventional source of energy for retracting the read/write head away from the disk is the spindle motor, which generates energy as it slows down but nevertheless continues to rotate for a period of time. This is illustrated in FIG. 1. The voltage VM generated by the slowing-down spindle motor produces a current 11 that passes through the VCM 13, to effect retraction of the read/write head.

Figure 2:
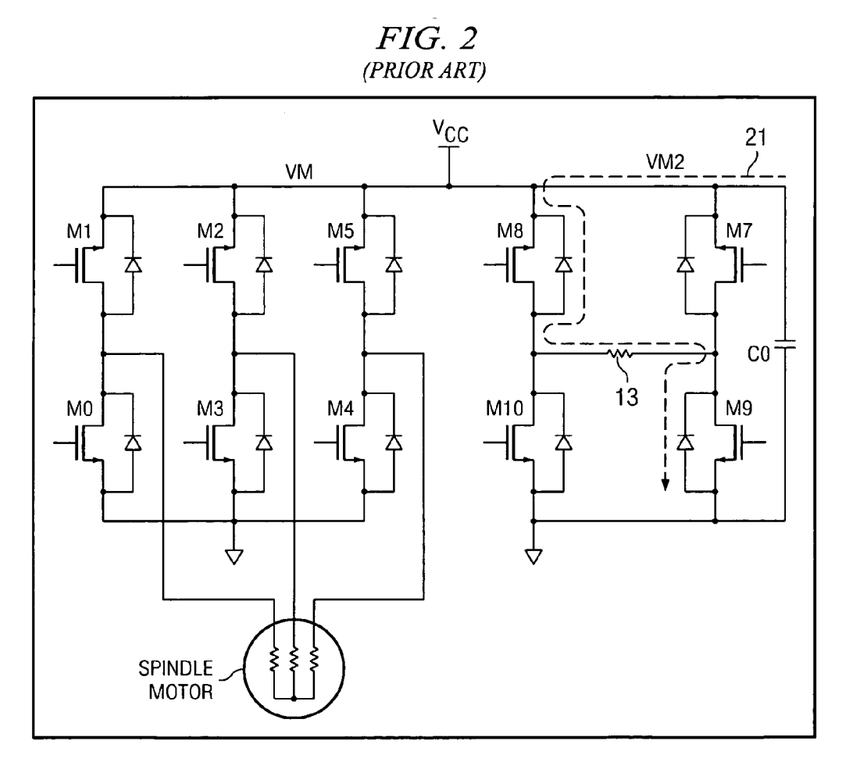
FIG. 2 illustrates the use of a storage capacitor to provide energy for retracting the read/write head according to the prior art.

Another known source of energy for retracting the read/write head is a storage capacitor C0 connected as shown in FIG. 2. Energy is stored in the capacitor C0 while the power supply is present during normal operation, and this stored energy is used to retract the read/write head after a power loss event. In particular, the capacitor voltage VM2 produces a current 21 which passes through the VCM 13 to effect retraction of the read/write head.

Figure 3:
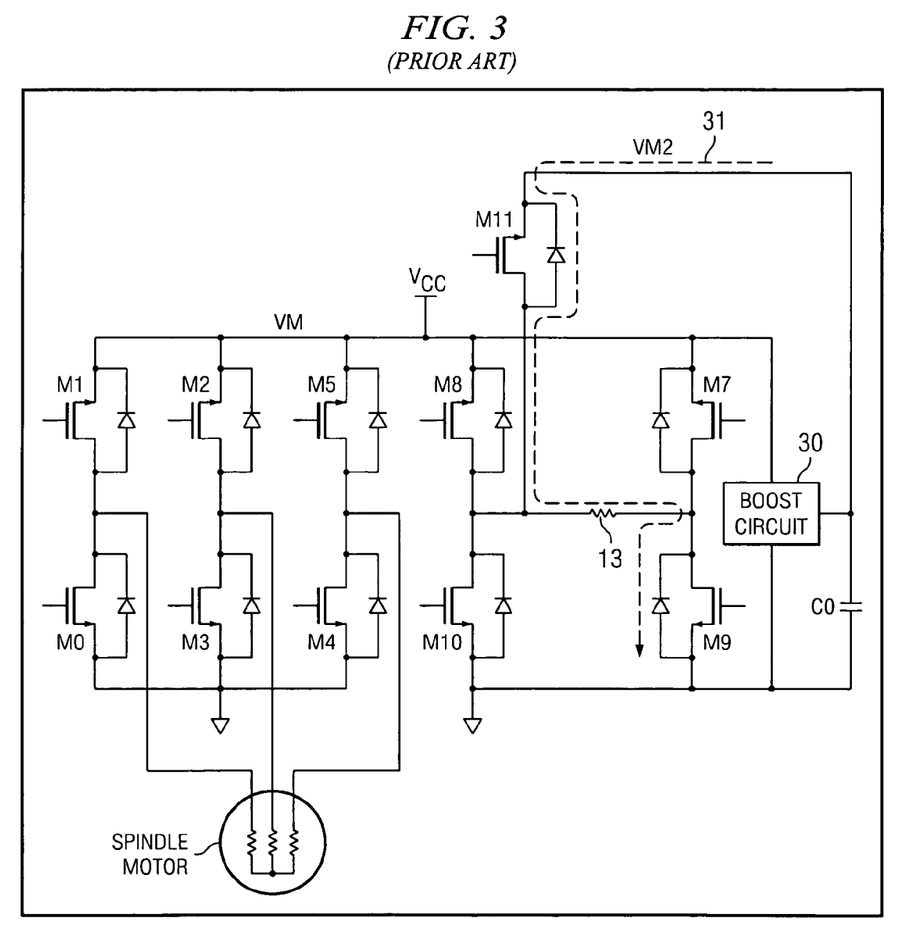
FIG. 3 illustrates the use of a storage capacitor combined with a boost circuit as an energy source for retracting the read/write head according to the prior art.

Another known scheme uses a capacitor in combination with a boost circuit such as shown in FIG. 3. The boost circuit 30, for example a charge pump, operates to boost the capacitor voltage to a level that is higher than the nominal power supply voltage VCC. As shown in FIG. 3, the boosted voltage arrangement requires an additional switching device, namely FET M11, for directing through the VCM 13 a current 31 produced by the boosted capacitor voltage VBOOST.

In any of the prior art approaches of FIGS. 1–3, the amount of energy available for moving the read/write head after a power loss event is limited. Accordingly, the present invention recognizes that the effectiveness of the power loss head retraction scheme depends on how efficiently the retraction energy source is utilized. That is, in order to provide for a reliably effective power loss retraction operation, the retraction energy source must be used efficiently.

It is therefore desirable to provide for a power loss head retraction architecture which uses the available retraction energy source more efficiently than the prior art approaches.

SUMMARY OF THE INVENTION

Exemplary embodiments of the invention operate during a power loss event to isolate the head retraction energy source from portions of the hard disk drive that are not needed to accomplish the retraction. This provides for an efficient use of the energy source.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form. (STMI)

Before undertaking the Detailed Description of the Invention below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

The figures and the various embodiments used to describe the principles of the present invention in this patent document are by way of illustration only and should not be construed in any way to limit the scope of the invention.

Exemplary embodiments of the invention provide for a more efficient use of the energy source for power loss read/write head retraction by isolating that energy source from other circuitry in the hard disk drive. More specifically, during power loss retraction operation, exemplary embodiments isolate the retraction energy source from those portions of the hard disk drive that are not necessary for the retraction operation. In this manner, the retraction energy source is efficiently used to power the retraction operation and is not drained by circuitry that is not used to perform the retraction operation.

Figure 4:
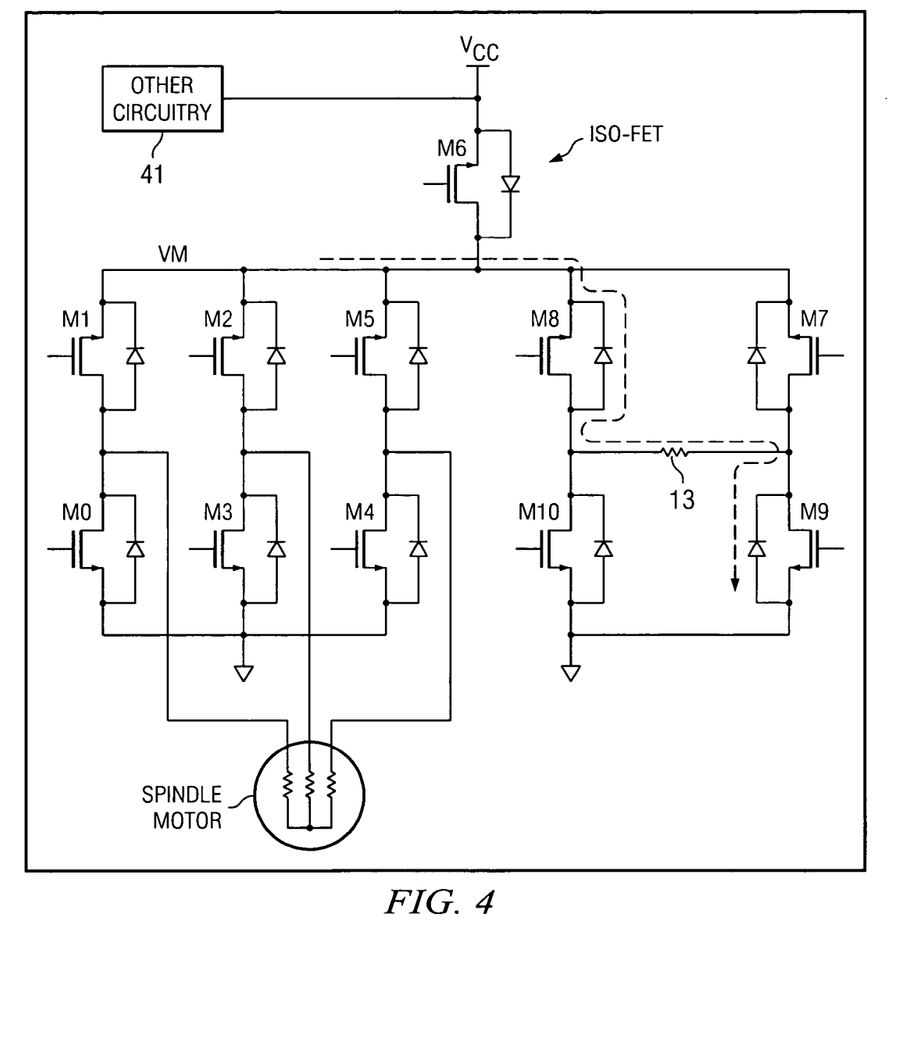
FIG. 4 diagrammatically illustrates exemplary embodiments of a power loss retraction architecture according to the invention which uses spindle motor energy.

FIG. 4 diagrammatically illustrates exemplary embodiments of the invention wherein the spindle motor provides power to retract the read/write head when a power loss event occurs. The example of FIG. 4 includes six spindle motor drivers M0–M5, and four VCM drivers M7–M10. When a power loss event occurs, the spindle motor, as it winds down, provides power to the VCM in generally similar fashion to FIG. 1 above. However, in the example of FIG. 4, an isolation device M6 (also designated as ISO-FET) is provided to isolate the spindle motor and associated drivers M0–M5 from other circuitry 41. The other circuitry 41 is powered by the normal power supply VCC, but is unrelated to the read/write head retraction operation. Accordingly, by isolating the spindle motor arrangement from the other circuitry 41, the energy provided by the spindle motor arrangement can be efficiently supplied to the VCM 13 to power the retraction operation, and the other circuitry 41 does not drain energy from the spindle motor arrangement. When a power loss event occurs, VCC is effectively inactivated, so the isolation device M6 (for example a MOSFET) is turned off because VCC is less than the spindle motor voltage VM. This places the effective diode of M6 into reverse bias, thereby isolating the other circuitry 41 from the spindle motor arrangement and the VCM arrangement.

Figure 5:
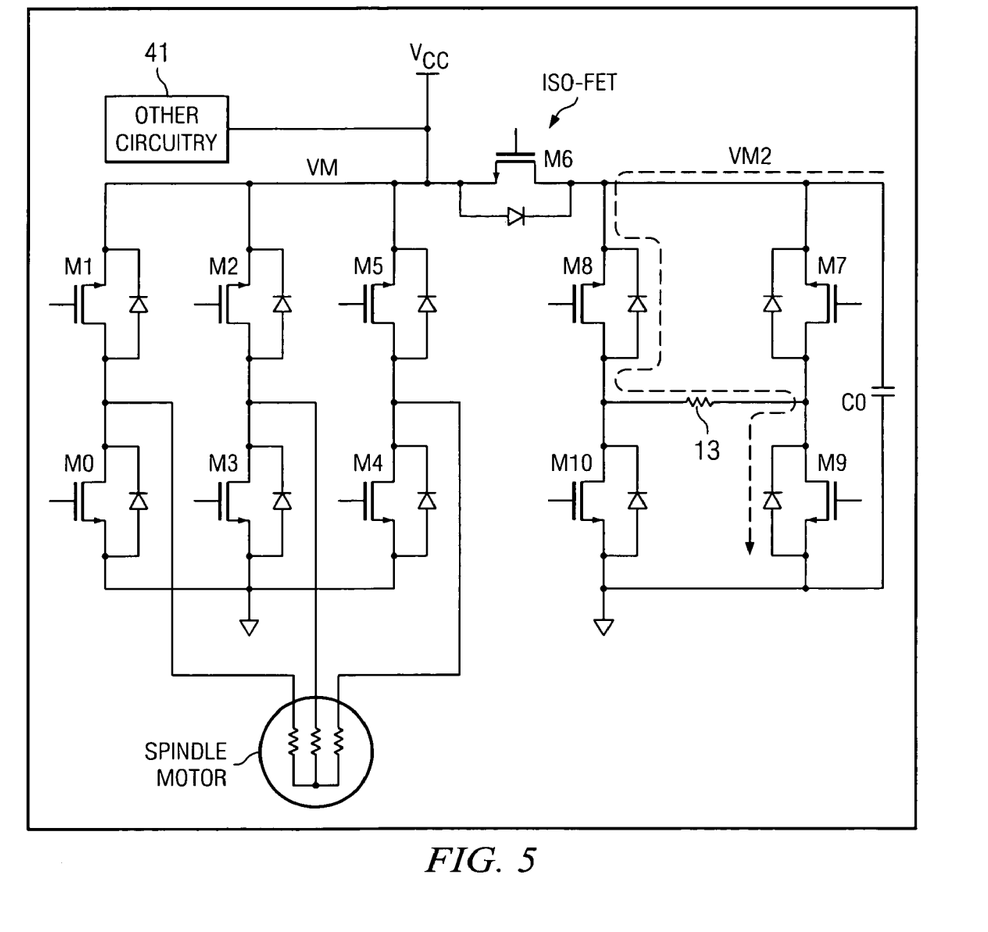
FIG. 5 diagrammatically illustrates exemplary embodiments of a power loss retraction architecture according to the invention which uses energy stored in a capacitor.

FIG. 5 diagrammatically illustrates exemplary embodiments of the invention wherein power loss retraction energy is provided by a capacitor C0. In FIG. 5, the power loss retraction energy is provided by the storage capacitor C0 in generally similar fashion to FIG. 2 above, but the isolation device M6 isolates the spindle motor arrangement and the other circuitry 41 from the capacitor C0 and the VCM arrangement. Again, when a power loss event occurs, VCC becomes less than the capacitor voltage VM2, so the isolation FET M6 is turned off, thereby isolating the capacitor C0 and the VCM arrangement from the remainder of the circuitry.

Figure 6:
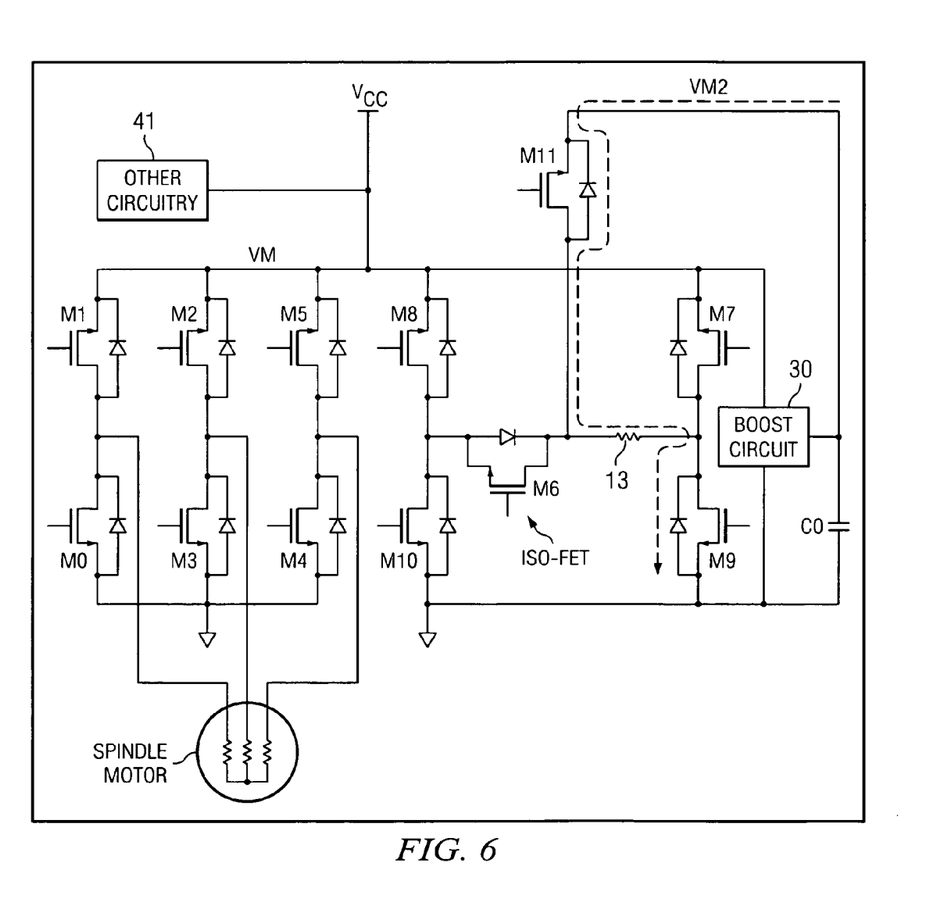
FIG. 6 diagrammatically illustrates exemplary embodiments of a power loss retraction architecture according to the invention which uses energy from a boost circuit-capacitor combination.

FIG. 6 diagrammatically illustrates exemplary embodiments of the invention wherein a boost circuit-capacitor combination provides power loss retraction energy. In FIG. 6, the combination of the boost circuit 30 and the capacitor C0 provides power loss retraction energy in generally similar fashion to FIG. 3 above. However, when a power loss event occurs, the isolation device M6 turns off, thereby isolating the VCM current path from the remainder of the circuitry of the hard disk drive apparatus. In some exemplary embodiments, the boost circuit 30 is a charge pump.

Figure 7:
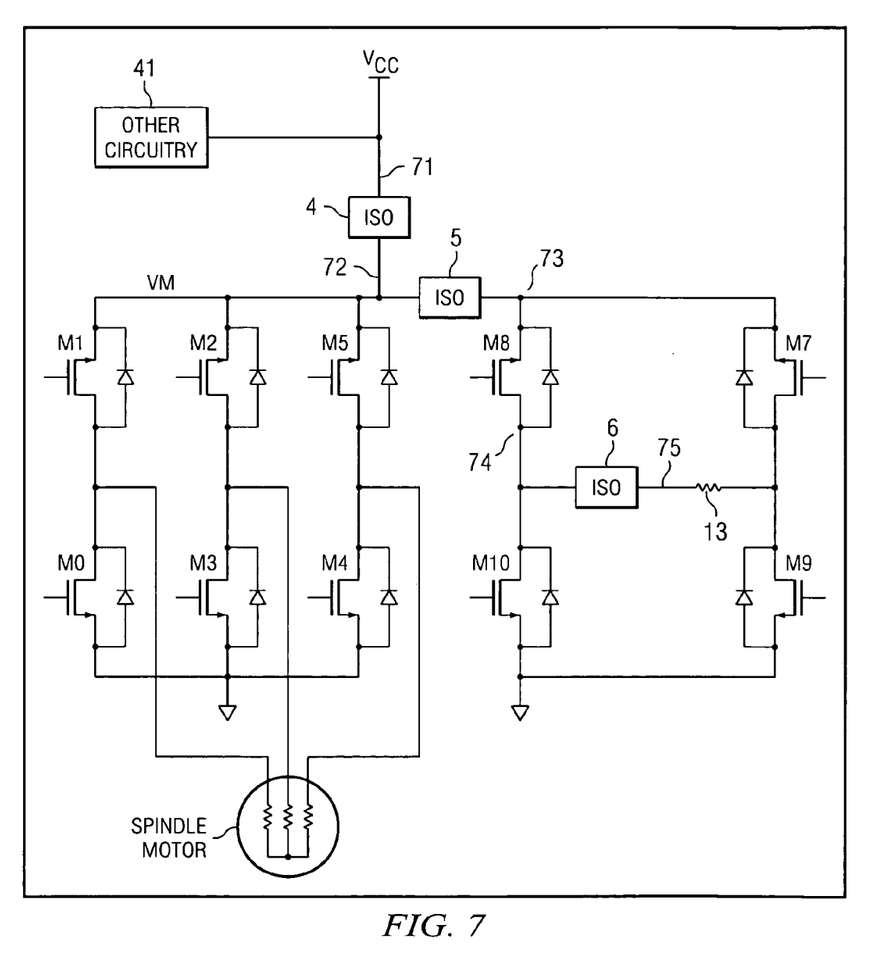
FIG. 7 diagrammatically illustrates a configurable, multi-mode power loss retraction architecture which is cooperable with any of the power loss retraction energy sources described above with respect to FIGS. 4–6.

FIG. 7 diagrammatically illustrates a configurable, multi-mode power loss retraction architecture which is cooperable with any of the power loss retraction energy sources described above with respect to FIGS. 4–6. In the architecture of FIG. 7, isolation devices (ISO) 4, 5 and 6 are connected in generally the same fashion as the isolation devices in FIGS. 4, 5 and 6, respectively. The architecture of FIG. 7 can be selectively configured to cooperate with any selected one of the power loss retraction energy sources of FIGS. 4–6. More particularly, in the integrated circuit which implements drivers M0–M5, M7–M10 and isolation devices 4–6, the nodes designated at 71–75 are physically accessible at the externally available pins of the integrated circuit. The proper isolation device is selected based upon which power loss retraction energy source is to be used, and the other two isolation devices can then be shunted out of the circuit.

For example, if the spindle motor is to be used as the power loss retraction energy source, then the externally accessible nodes 72 and 73 are shorted together and the externally accessible nodes 74 and 75 are shorted together, thereby eliminating isolation devices 5 and 6 from the circuit, which results in the arrangement of FIG. 4. Similarly, if the capacitor C0 of FIG. 5 is to be used as the power loss retraction energy source, then externally accessible nodes 71 and 72 are shorted together, and externally accessible nodes 74 and 75 are shorted together, thereby eliminating isolation devices 4 and 6 from the circuit, which results in the arrangement of FIG. 5. Finally, if the boost circuit-capacitor combination of FIG. 6 is to be used as the power loss retraction energy source, then externally available nodes 71, 72 and 73 are all shorted together, thereby eliminating isolation devices 4 and 5 from the circuit, which results in the arrangement of FIG. 6. In some exemplary embodiments, the isolation devices 4–6 are MOSFETs such as M6 of FIGS. 4–6.

Figure 8:
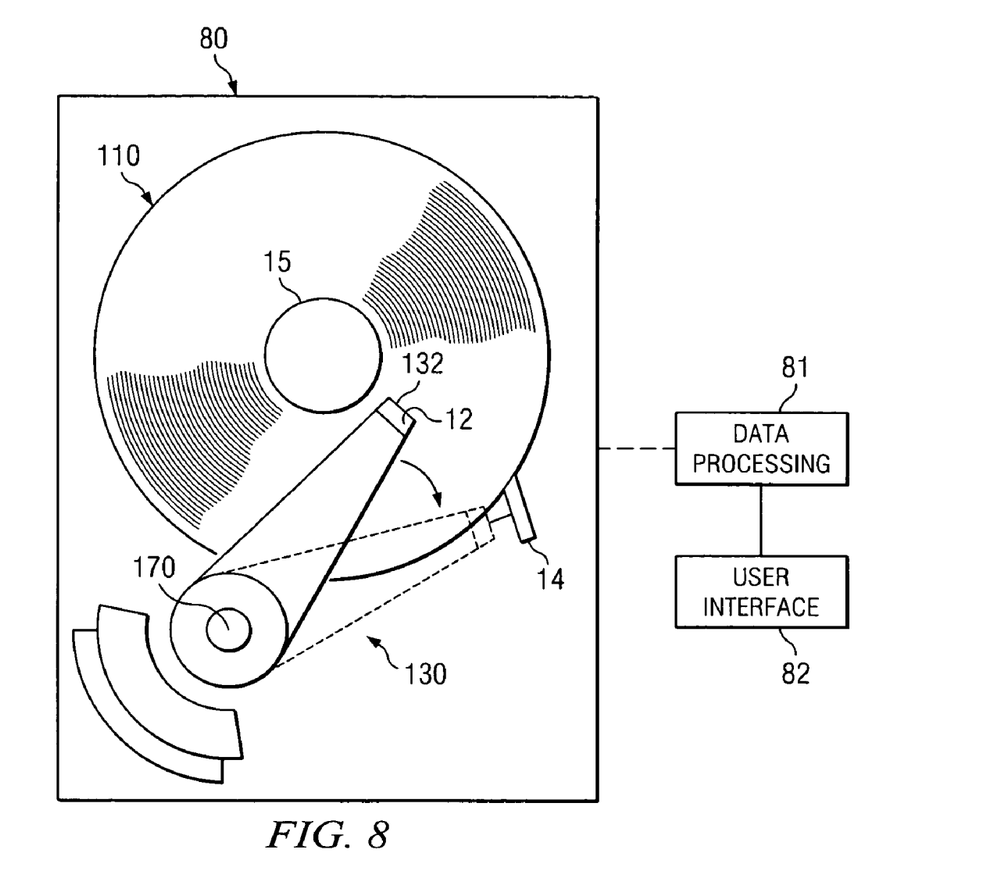
FIG. 8 diagrammatically illustrates exemplary embodiments of a data processing apparatus including a hard disk drive having a power loss retraction architecture according to the invention.

FIG. 8 diagrammatically illustrates exemplary embodiments of a data processing apparatus according to the invention. The apparatus of FIG. 8 includes a hard disk drive 80 which includes a ramp 14 arranged outside and near a storage disk 110. During the retraction operation, the VCM arm 130 rotates about shaft 170 and retracts the read/write head 12 away from the disk 110. A tab 132 slides onto the ramp 14 to position the read/write head 12 in a non-contacting state with respect to the disk 110. In various exemplary embodiments, the hard disk drive 80 can include the various power loss head retraction arrangements described above with respect to FIGS. 4–7. A data processing portion (e.g., a microprocessor device or microprocessor-based circuit) 81 is coupled to the hard disk drive 80 for permitting the data processing portion 81 to store data onto and retrieve data from the data storage disk 110. A user interface 82 is coupled to the data processing portion 81 for permitting communication between the data processing portion 81 and a user. In some embodiments, the user interface can include one or more of a tactile interface, a visual interface and an audio interface. The data processing system of FIG. 8 can be, in some exemplary embodiments, a desktop computer, a notebook computer, a personal digital assistant (PDA), or a digital camera.

Although the present invention has been described in detail, those skilled in the art will understand that various changes, substitutions, and alterations herein may be made without departing from the spirit and scope of the invention it its broadest form.

What is claimed is:

1. An apparatus for retracting a read/write head from a memory disk of a hard disk drive, comprising:
   a motor for moving the read/write head;
   a first power source coupled to said motor;
   a retract power source coupled to said first power source and said motor, said retract power source for providing said motor with power to retract the read/write head when said first power source is inactivated;
   electrical circuitry other than said motor and said power sources, said electrical circuitry coupled to said power sources;
   a first isolation device connected between said retract power source and said electrical circuitry for isolating said retract power source from said electrical circuitry when said first power source is inactivated; and
   a second isolation device connected between said motor and said retract power source for isolating said retract power source from said motor when said first power source is inactivated.

2. The apparatus of claim 1, wherein said electrical circuitry includes a spindle motor.

3. The apparatus of claim 1, wherein said isolation device includes a FET.

4. The apparatus of claim 1, wherein said retract power source includes a spindle motor.

5. The apparatus of claim 1, wherein said retract power source includes a capacitor.

6. The apparatus of claim 5, wherein said retract power source includes a boost circuit coupled to said capacitor.

7. The apparatus of claim 6, wherein said electrical circuitry includes a spindle motor.

8. The apparatus of claim 5, wherein said electrical circuitry includes a spindle motor.

9. The apparatus of claim 1, wherein said isolation device is connected to said motor.

10. A hard disk drive apparatus, comprising:
    a memory disk for storing data;
    a read/write head supported for operative engagement with and retraction from said memory disk;
    a motor operatively coupled to said read/write head;
    a first power source coupled to said motor;
    a retract power source coupled to said first power source and said motor, said retract power source for providing said motor with power to retract the read/write head when said first power source is inactivated;
    electrical circuitry other than said motor and said power sources, said electrical circuitry coupled to said power sources;
    a first isolation device connected between said retract power source and said electrical circuitry for isolating said retract power source from said electrical circuitry when said first power source is inactivated; and
    a second isolation device connected between said motor and said retract power source for isolating said retract power source from said motor when said first power source is inactivated.

11. The apparatus of claim 10, wherein said electrical circuitry includes a spindle motor.

12. The apparatus of claim 10, wherein said isolation device includes a FET.

13. The apparatus of claim 10, wherein said retract power source includes a spindle motor.

14. The apparatus of claim 10, wherein said retract power source includes a capacitor.

15. The apparatus of claim 14, wherein said retract power source includes a boost circuit coupled to said capacitor.

16. The apparatus of claim 15, wherein said electrical circuitry includes a spindle motor.

17. The apparatus of claim 14, wherein said electrical circuitry includes a spindle motor.

18. The apparatus of claim 10, wherein said isolation device is connected to said motor.

19. A data processing apparatus, comprising:
    a data processor comprising a microprocessor circuit adapted to process data;
    a user interface coupled to said data processor; and
    a hard disk drive coupled to said data processor, including a memory disk for storing data, a read/write head supported for operative engagement with and retraction from said memory disk, a motor operatively coupled to said read/write head, a first power source coupled to said motor, a retract power source coupled to said first power source and said motor, said retract power source for providing said motor with power to retract the read/write head when said first power source is inactivated, electrical circuitry other than said motor and said power sources, said electrical circuitry coupled to said power sources, a first isolation device connected between said retract power source and said electrical circuitry for isolating said retract power source from said electrical circuitry when said first power source is inactivated, and a second isolation device connected between said motor and said retract power source for isolating said retract power source from said motor when said first power source is inactivated.

20. The apparatus of claim 19, provided as one of a desktop computer, a notebook computer, a personal digital assistant and a digital camera.

* * * * *